INVENTOR
LUDWIG HESS
BY
A. W. Weller
ATTORNEY

Patented July 27, 1937

2,088,239

UNITED STATES PATENT OFFICE 2,088,239

PROCESS FOR THE PRODUCTION OF HYDROGEN PEROXIDE

Ludwig Hess, Berlin-Friedenau, Germany, assignor to Deutsche Gold-und Silber-Scheideanstalt vormals Roessler, Franfort-on-the-Main, Germany, a corporation of Germany Application April 26, 1934, Serial No. 722,445
In Germany August 17, 1932

8 Claims. (Cl. 202—52)

This invention relates to an apparatus for the production of hydrogen peroxide from liquids, such as solutions of peracids or persalts, which are capable of yielding hydrogen peroxide by distillation, employing tubular distillation apparatus.

It is known to allow solutions of persulphuric acid in sulphuric acid or solutions of persulphates to flow through upright, externally heated tubes and to distil off the hydrogen peroxide vapour formed upwards in countercurrent to the direction of flow of the liquid. It is further known to suck solutions of persulphuric acid or persulphates from below upwards through upright heated tubes, the hydrogen peroxide vapour evolved passing through the tube in the same direction as the liquid.

Processes of the aforesaid kind have the disadvantage that the distillation process, when carried out in relatively narrow tubes, does not proceed evenly and smoothly, but is accompanied by bumping, owing to the movement of a mixture of liquid and vapours evolved therefrom. In order to effect practically quantitative production of hydrogen peroxide it is, moreover, necessary to employ very long distillation tubes or to carry out the distillation in stages in different upright tubes.

According to the present invention the distillation of the hydrogen peroxide-yielding solutions is effected in an apparatus comprising a horizontally disposed tube or tubes, which is or are heated by an inner heating space and which may also be heated externally as well.

The accompanying diagrammatic drawing shows, by way of example, three embodiments of apparatus according to the invention.

Figure 1:
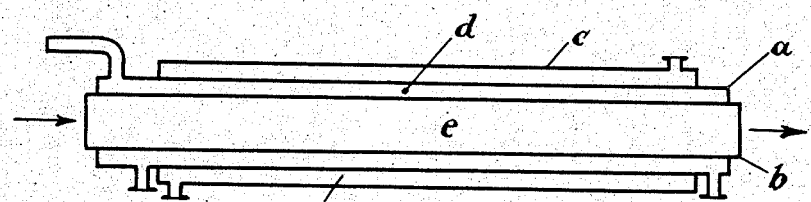
Fig. 1 is a sectional view of a tubular vaporizer according to the invention.
Figure 2:
Fig. 2 shows a similar view of another vaporizer.

Referring to Figs. 1 and 2, a horizontally disposed distillation tube $a$ has a heating tube $b$, disposed therein, and an external tube $c$ surrounding the distillation tube $a$. The annular distillation space $d$ is accordingly bounded by an inner heating space $e$ and an outer heating space $f$.

The horizontal tube vaporizer is preferably so operated that the vaporization of the liquid flowing through the annular space $d$ is in the main effected by the internal heating. The inner heating tube $b$ consists preferably of a satisfactory heat conducting material, for example a metal, suitable for carrying out the process, particularly lead or a lead alloy. The distillation tube $a$ may likewise consist of metal, for example lead. In order to prevent the lead tube $a$ from collapsing and since the heat supply is chiefly effected by the inner heating space $e$, the tube casing may be constructed relatively strong or lower vapour pressures may be employed in the outer heating space $f$. For the same reason the distillation tube may also consist of a material of poor heat conductivity, for example ceramic material, such as porcelain, stoneware, synthetic resinous masses such as those commercially known as "Haveg" and the like.

The three tubes, the inner heating tube, the distillation tube and the outer heating tube, may be disposed concentrically. These tubes may however also be disposed eccentrically. The latter is advantageous with regard to the inner heating tube. In this case the distillation is so carried out, that the part of the distillation tube in which the eccentric inner heating tube is disposed, is filled with liquid, whilst the space above the same is left free for the distillation vapours. In certain circumstances it is advisable, in order to utilize the vapour as much as possible, to insert a filling body in the inner heating tube. This filling body may be constructed in the shape of a screw.

Fig. 2 shows such a vaporizer, in which the inner heating tube is provided with such a screw shaped filling body $k$.

Several tubes provided according to the invention with internal heating may, of course, also be disposed in one common heating space effecting the external heating of all the tubes. Similarly several internal heating tubes may be employed for heating one distillation tube. These inner heating tubes may be symmetrically distributed in the distillation tube, they may however also be predominantly disposed in one part of the distillation tube, in which event the distillation is preferably carried out as has been described when employing an eccentric heating tube.

In order to carry the invention practically into effect several horizontal vaporizers are with advantage connected in series in such a way that the liquid, after flowing through the first vaporizer, enters the second and from the second enters the third and so on. The tube vaporizers forming a system may be disposed one above the other, side by side, or for example also stepped. When employing such aggregates the liquid flow may be conducted from above downwards or from below upwards through the aggregate. The former embodiment has the advantage that no force is required for conveying the liquid. Finally the tubes may be connected in series in the liquid flow but in parallel in the hydrogen peroxide vapour flow.

Figure 3:
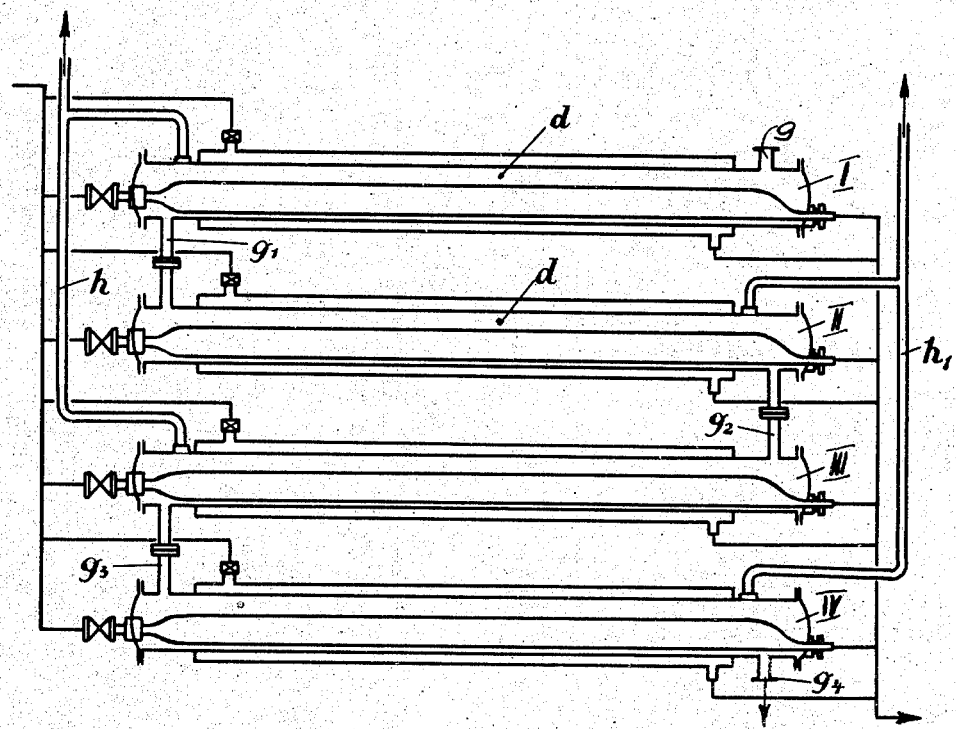
Fig. 3 shows a similar view of four vaporizers connected in series.

Referring to Fig. 3, a system of four tube vaporizers I, II, III and IV are connected in series and disposed one above the other.

The liquid to be distilled enters the distillation space $d$ of the vaporizer I at $g$ and flows through the vaporizer system by the action of a vacuum. From the vaporizer I the liquid flows through the lead $g_1$ into the vaporizer II, through the lead $g_2$ into the vaporizer III, through the lead $g_3$ into the vaporizer IV and leaves the latter at $g_4$. The discharging mixture of hydrogen peroxide vapour and water vapour leaves the vaporizer chambers through the leads $h$ and $h_1$, which convey the same to the condenser (not shown). It is possible by throttling the outlets $g_1$, $g_2$, $g_3$ and $g_4$ to maintain the level of liquid flowing through the horizontal vaporizer at the desired height, in such a way that a vapour space is left above the space filled by the liquid. The great advantage is obtained thereby that the vaporizing hydrogen peroxide can be immediately separated from the liquid and be rapidly discharged from the vapour space by the liquid stream.

A particular advantage of the apparatus consists therein that it enables hydrogen peroxide of high concentrations to be directly obtained without the use of fractional condensation as hitherto employed and hydrogen peroxide solutions of different concentrations to be obtained from one tube system. For this purpose the operation when employing tube aggregates as shown in Fig. 3 is carried out by conveying the vapours formed in the individual tubes separately to the condensation apparatus and recovering them separately. Since the hydrogen peroxide content of the vapour increases as the distillation proceeds the vapour mixture discharging from tube IV and if desired from tube III may, for example, be condensed by direct cooling and in this way hydrogen peroxide of high concentrations may be obtained. The vapour mixture relatively poor in hydrogen peroxide discharging from the first tubes, particularly tube I, may be brought to the desired concentration in known manner by fractional condensation.

According to one modification of the invention an apparatus is employed in which external heating of the distillation space is dispensed with. Thus it has been found that such a considerable distillation action may be obtained even with internal heating alone that the disposal of an external heating space is not necessary particularly if the outer casing of the distillation space is protected against loss of heat.

The heating surface and consequently the speed of vaporization depends, when employing internal heating, on the diameter of the external tube (distillation tube) and that of the inner tube (heating tube). In this case the heating tube may be of such a diameter that only a relatively very small intermediate space is left between the distillation tube and the heating tube. It is consequently possible to obtain very great heating surfaces and consequently very great speed of vaporization. The introduction of the heating vapour into the inner tube, moreover, offers the advantage that metallic heating tubes, particularly lead tubes, may be employed, without the danger of troublesome collapsing taking place, such as occurs, when employing distillation tubes consisting of lead, which are only surrounded by one outer heating jacket. It has been found that the wall thickness of inner heating tubes of lead may be kept relatively small and that consequently greater heating effects may be obtained, without any danger of collapsing existing.

Instead of lead tubes, tubes of other more resistant metals may, however, also be employed, for example iron or copper tubes, provided they are protected at the points where they come into contact with the acid liquid and hydrogen peroxide, by over-layers of suitable materials, for example by homogeneous over-layers of lead.

What I claim is:

1. Process for the distillation of hydrogen peroxide from solutions containing the same in a horizontally disposed tube having a smaller tube arranged therein, comprising introducing the solution into said first tube in a quantity insufficient to fill completely the space between the first and second tubes, thereby leaving a free space above the solution to receive the vaporized hydrogen peroxide, and passing a heating medium into said smaller tube to heat the solution to distillation temperature while substantially preventing condensation in said space of hydrogen peroxide vaporized from said solution.

2. Process for the distillation of hydrogen peroxide from solutions containing the same, in a horizontally disposed tube having a smaller tube arranged therein, comprising introducing the solution into said first tube in a quantity insufficient to fill completely the space between the first and second tubes, thereby leaving a free space above the solution to receive the vaporized hydrogen peroxide, and passing steam into said smaller tube and on the outside of said first tube, to heat the solution to distillation temperature.

3. Process for distilling hydrogen peroxide from solutions containing the same in a device having a horizontally disposed main distilling tube and a smaller tube within said main distilling tube, which consists in introducing the solution into the main distilling tube in a quantity insufficient to fill the same, thereby leaving a space in the upper part of the tube, introducing steam into the inner tube to heat the solution and thereby driving off vapors of hydrogen peroxide therefrom, such vapors collecting in the said space, causing the solution and vapors to flow together along the tube in a horizontal direction while maintaining them sufficiently heated to prevent condensation of the vapors in said space, withdrawing the vapors from the upper part of the tube, and then condensing the vapors.

4. Process for distilling hydrogen peroxide from solutions containing the same in a device having a horizontally disposed main distilling tube, a smaller tube within said main distilling tube, and a heating jacket around said main tube, which consists in introducing the solution into the main distilling tube in a quantity insufficient to fill the same, thereby leaving a space in the upper part of the tube, introducing steam into the inner tube and the heating jacket to heat the solution, thereby driving off vapors of hydrogen peroxide therefrom, such vapors collecting in the said space, causing the solution and vapors to flow together along the tube in a horizontal direction while maintaining them sufficiently heated to prevent condensation of the vapors, withdrawing the vapors from the upper part of the tube, and then condensing the vapors.

5. Process for the distillation of hydrogen peroxide from solutions containing the same, in a plurality of horizontally disposed tubes each having a smaller tube arranged therein, comprising passing the solution successively through said first tubes in quantities insufficient to fill completely the spaces between the first and second tubes, thereby leaving free spaces above the solution to receive the vaporized hydrogen peroxide, passing steam into said smaller tubes to heat the solution to distillation temperature while substantially preventing condensation in said spaces of hydrogen peroxide vaporized from said solution, collecting and condensing separately the vaporized hydrogen peroxide from the various tubes.

6. A process as claimed in claim 1 in which said smaller tube is composed of a material selected from the group consisting of lead and lead alloys.

7. Process for the distillation of hydrogen peroxide from solutions containing the same, in a plurality of horizontally disposed tubes each having a smaller tube arranged therein, comprising passing the solution successively through said first tubes in quantities insufficient to fill completely the spaces between the first and second tubes, thereby leaving free spaces above the solution to receive the vaporized hydrogen peroxide, passing steam into said smaller tubes and on the outside of said first tubes, to heat the solution to distillation temperature, and collecting and condensing separately the vaporized hydrogen peroxide from the various tubes.

8. A process as claimed in claim 1, in which said first tube is composed of ceramic material.

LUDWIG HESS.